M. JESS.
TRACTION ENGINE.
APPLICATION FILED MAR. 22, 1911.

1,038,379.

Patented Sept. 10, 1912.

3 SHEETS—SHEET 1.

Witnesses
J. L. Wright.
V. B. Hillyard.

Inventor
Marx Jess,

By Victor J. Evans,
Attorney

M. JESS.
TRACTION ENGINE.
APPLICATION FILED MAR. 22, 1911.

1,038,379.

Patented Sept. 10, 1912.

3 SHEETS—SHEET 2.

M. JESS.
TRACTION ENGINE.
APPLICATION FILED MAR. 22, 1911.

1,038,379.

Patented Sept. 10, 1912.

3 SHEETS—SHEET 3.

Witnesses
J. L. Wright
V. B. Hillyard

Inventor
Marx Jess
By Victor J. Evans,
Attorney

UNITED STATES PATENT OFFICE.

MARX JESS, OF STICKNEY, SOUTH DAKOTA.

TRACTION-ENGINE.

1,038,379.  Specification of Letters Patent.  Patented Sept. 10, 1912.

Application filed March 22, 1911. Serial No. 616,117.

*To all whom it may concern:*

Be it known that I, MARX JESS, a citizen of the United States, residing at Stickney, in the county of Aurora and State of South Dakota, have invented new and useful Improvements in Traction-Engines, of which the following is a specification.

The present invention provides a traction engine designed most especially for use in agricultural districts for drawing field implements and machinery over the ground and for operating milling and other machinery which is generally driven by means of an engine.

The invention provides an engine which may be adapted to the surface of the ground so as to run approximately with the motor level which is essential in engines of the internal combustion type and also in traction engines to prevent abnormal strain on the running gear and structure generally.

The invention provides an engine embodying a novel general structure and arrangement of parts and which will admit of independent adjustment of the steering wheels to adapt them to the condition of the surface of the ground so that one wheel may operate in a higher plane than the other wheel, as when using the engine for drawing a plow over the field.

The invention contemplates novel mountings for the steering wheels and peculiar connections whereby the steering wheels may be independently adjusted and controlled in any relative adjusted position to direct the engine when in motion.

The invention further contemplates a novel transmission for connecting the engine or motor with the drive wheel, which will admit of stopping and starting the engine at will.

The invention consists of the novel features, details of construction and combination of parts, which hereinafter will be more particularly set forth, illustrated in the accompanying drawings, and pointed out in the appended claim.

Figure 1:
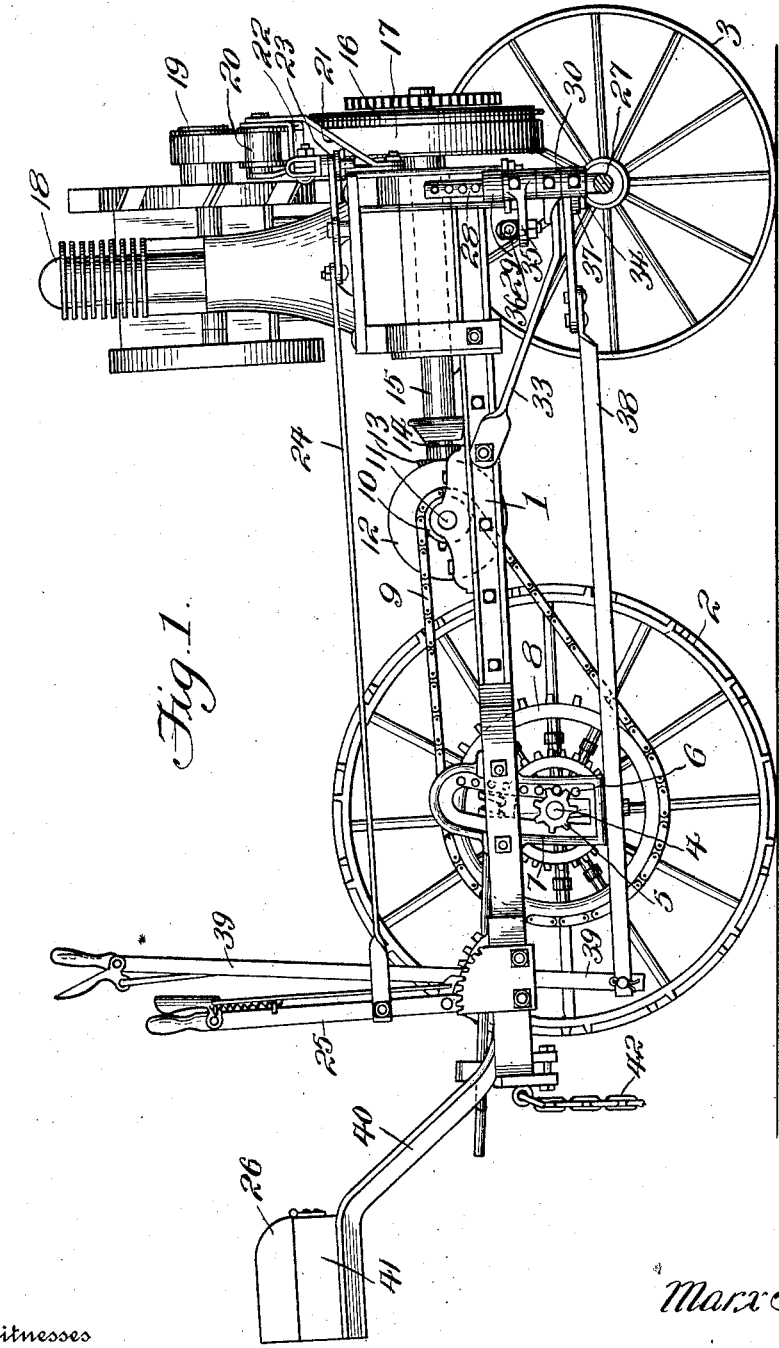
Figure 2:
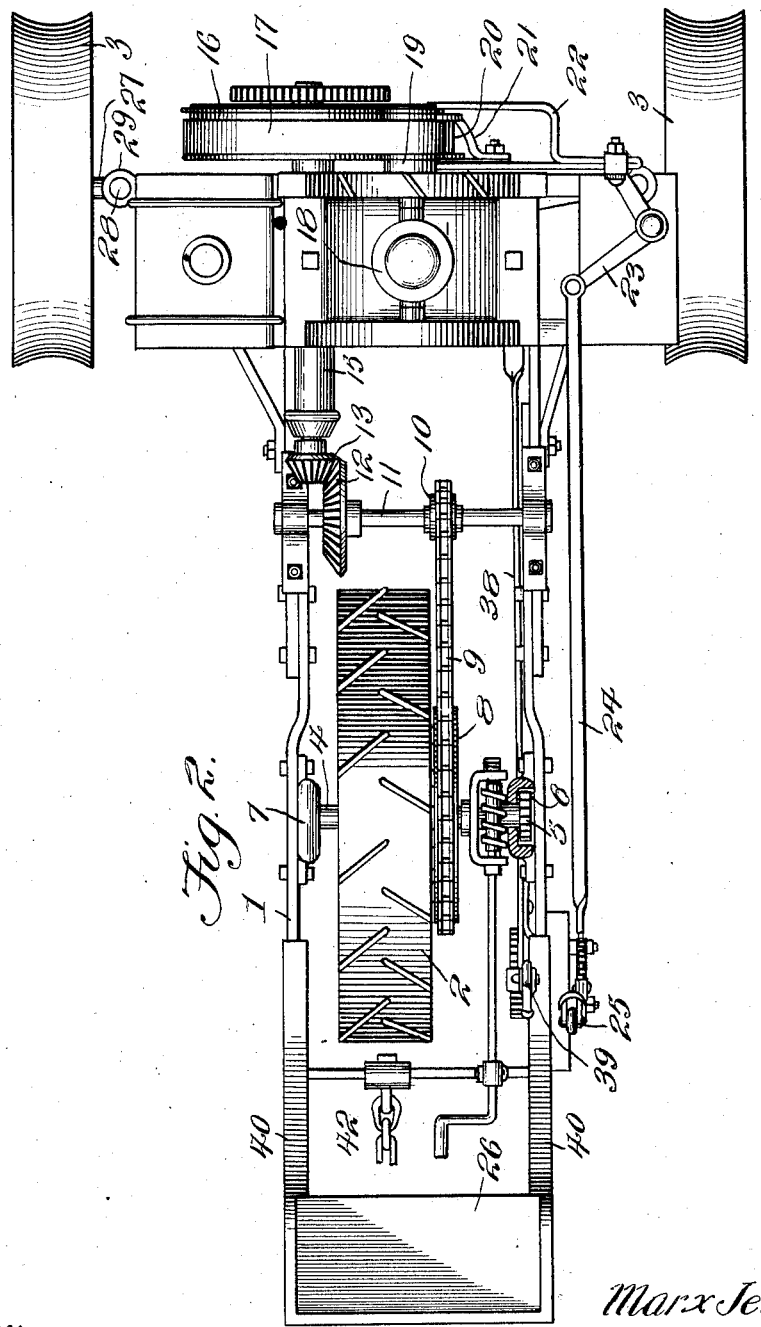
Figure 3:
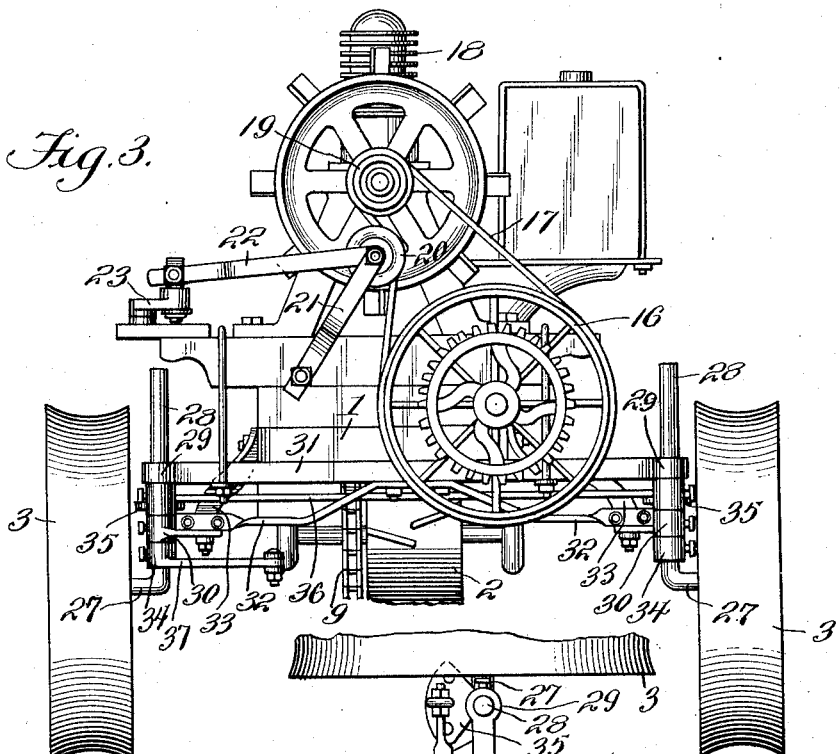
Figure 4:
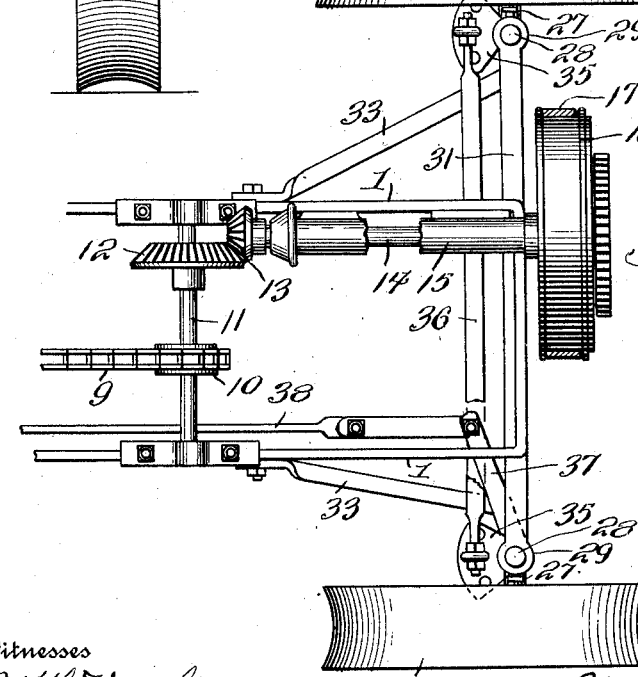

Referring to the drawings, forming a part of the specification, Figure 1 is a side view of a traction engine embodying the invention. Fig. 2 is a top plan view. Fig. 3 is a front view. Fig. 4 is a detail plan view, showing more clearly the relative arrangement of the parts associated more particularly with the steering mechanism and the drive wheel.

Corresponding and like parts are referred to in the following description, and indicated in all the views of the drawings, by the same reference characters.

The main frame of the engine is indicated at 1 and is preferably of rectangular form and is mounted upon three wheels, the one constituting the driver being indicated at 2 and the remaining two being indicated at 3 and mounted both to turn and to be independently adjusted vertically. The single wheel 2 is located centrally of the longitudinal bars of the frame, whereas the steering wheels 3 are located exterior to said longitudinal bars. The drive wheel 2 is mounted loosely upon an axle 4, which is adjustable vertically and provided at its ends with pinions 5, which coöperate with rack teeth 6 at one side of the slotted guides 7 firmly secured to the longitudinal bars of the frame 1. This arrangement admits of the rear portion of the frame being adjusted vertically to suit the implement or agricultural machine to be drawn over the field. A sprocket rim 8 is secured to the spokes or other convenient part of the drive wheel and power is applied thereto by means of a sprocket chain 9, which passes around the sprocket wheel 8 and around a sprocket pinion 10 secured to a transverse shaft 11 mounted in bearings provided upon the frame 1.

A bevel gear 12 is secured to the shaft 11 and is in mesh with a bevel pinion 13 secured to the inner or rear end of a longitudinal shaft 14, which is mounted in a sleeve 15 secured to the frame 1. A belt pulley 16 is secured to the front end of the shaft 14 and is adapted to be driven from the engine by means of a belt 17. The pulley 16 has outer flanges at its sides to retain the drive belt 17 in place and prevent slipping thereof from the pulley. The engine is indicated at 18 and is of the internal combustion type, being preferably a gasolene engine. The engine or crank shaft has a pulley 19 secured thereto, which receives the drive belt 17, said pulley having side flanges to prevent slipping of the belt therefrom. When the drive belt 17 is loose no power is transmitted to the shaft 14, but when the drive belt is taut it serves to transmit power from the engine shaft to the shaft 14. A belt tightener is arranged to coöperate with the drive belt 17 and comprises a pulley 20 and a pivoted arm 21. A link 22 is pivotally connected to the axle upon which the pulley 20 is mounted and has connection with one member of a bell crank 23, the other member of said bell crank being connected by means of a rod 24 with an operating lever 25 extending within convenient reach of the driver's seat 26. Upon operating the lever 25 the pulley 20 may be moved to effect a tightening or a loosening of the drive belt 17. When the drive belt 17 is loose no movement is imparted to the drive wheel 2, but when the drive belt 17 is under tension and the engine is running power is transmitted to the drive wheel 2 for propelling the machine over the field.

Each of the wheels 3 is mounted upon a spindle 27 projecting horizontally from a vertical shaft 28, which is mounted in bearing sleeves 29 and 30 so as to turn and to move vertically. The bearing sleeves 29 are located at the outer ends of an axle 31, which is secured to the front portion of the frame 1. The sleeves 30 are located at the outer ends of the braces 32 which are secured at their inner upper ends to the main frame or axle and have their outer ends attached to rearwardly extending braces 33. Set collars 34 mounted upon the lower portions of the shafts 28 engage the lower ends of the bearing sleeves 30 and support the front portion of the engine. A sector plate 35 is secured to each of the shafts 28 and is adjustable thereon to admit of relatively adjusting the wheels 3 to the required elevation. The sector plates 35 are adapted to engage the lower ends of the bearing sleeves 29 and are connected by means of a transverse rod or bar 36 so that both shafts 28 and wheels 3 move in unison. An arm 37 is firmly attached to one of the shafts 28 and a rod or bar 38 connects said arm to an operating lever 39 arranged within convenient reach of the driver's seat 26. Both operating levers 25 and 39 are adapted to be secured in the adjusted position, each being supplied with the usual latch to engage a notched segment.

The driver's seat 26 is located at the rear of the machine and is connected with the frame 1 by means of braces 40. A tool box 41 is mounted upon the braces 40 for convenience and may be utilized to form the seat.

A draft chain 42 is connected to the rear of the frame 1 and serves to connect the engine to the machine or implement to be drawn over the field.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

In a traction engine, the combination of an axle having vertical bearing sleeves at its ends, braces secured at their inner ends to the axle and having their outer ends spaced therefrom and formed with vertical bearing sleeves in line with the bearing sleeves at the ends of the axle, other braces secured at their forward ends to the outer ends of the first mentioned braces and connected at their rear ends to the frame of the machine, vertical shafts mounted in the bearing sleeves of the axle and braces and formed at their lower ends with spindles upon which supporting wheels are mounted, set collars secured to the lower ends of the vertical shafts and engaging the bearing sleeves of the braces, sector plates mounted upon the vertical shafts and arranged between the bearing sleeves at the ends of the axle and the braces and engaging the opposing ends of both bearing sleeves, a bar adjustably connecting the sector plates, an arm secured to one of the vertical shafts and operating lever, and connecting means between the said arm and operating lever.

In testimony whereof I affix my signature in presence of two witnesses.

MARX JESS.

Witnesses:
W. P. SMITH,
R. H. GOODROW.

Copies of this patent may be obtained for five cents each, by addressing the "Commissioner of Patents, Washington, D. C."